(12) United States Patent
Harada

(10) Patent No.: US 9,599,063 B2
(45) Date of Patent: Mar. 21, 2017

(54) ENGINE UNIT FOR VEHICLE

(71) Applicant: YAMAHA HATSUDOKI KABUSHIKI KAISHA, Iwata-shi, Shizuoka (JP)

(72) Inventor: Naoki Harada, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 147 days.

(21) Appl. No.: 14/636,322

(22) Filed: Mar. 3, 2015

(65) Prior Publication Data
US 2016/0017841 A1 Jan. 21, 2016

(30) Foreign Application Priority Data
Jul. 18, 2014 (JP) ................. 2014-148124

(51) Int. Cl.
*F01P 1/00* (2006.01)
*F02F 7/00* (2006.01)
*F16C 3/04* (2006.01)

(52) U.S. Cl.
CPC .............. *F02F 7/0043* (2013.01); *F16C 3/04* (2013.01)

(58) Field of Classification Search
CPC ................................. F02F 7/0043; F16C 3/04
USPC .................................................... 123/196 R
See application file for complete search history.

(56) References Cited

U.S. PATENT DOCUMENTS

| | | | | |
|---|---|---|---|---|
| 2,754,814 A * | 7/1956 | Hopwood | ................ | F01M 1/04 123/196 R |
| 6,508,224 B2 * | 1/2003 | Ito | ............... | F01L 1/024 123/195 R |
| 7,140,934 B2 * | 11/2006 | Hoi | ................ | B63B 35/731 123/196 A |
| 7,219,644 B2 * | 5/2007 | Hoi | ............... | F01M 5/007 123/196 AB |
| 8,307,804 B2 * | 11/2012 | Ohta | ............... | F01M 1/06 123/196 R |
| 2001/0029921 A1 * | 10/2001 | Ito | ............ | F01M 1/04 123/196 R |
| 2002/0033148 A1 * | 3/2002 | Ito | ............. | F01P 5/02 123/41.65 |
| 2003/0017766 A1 * | 1/2003 | Gokan | ............... | F01M 1/02 440/88 J |
| 2006/0223392 A1 * | 10/2006 | Noda | ............. | F02M 35/168 440/88 A |
| 2008/0173225 A1 * | 7/2008 | Proto | ............... | B63B 1/24 114/55.54 |
| 2011/0053440 A1 * | 3/2011 | Dusablon | ............. | B63H 11/103 440/46 |

(Continued)

FOREIGN PATENT DOCUMENTS

JP 2003-027911 A 1/2003

*Primary Examiner* — Marguerite McMahon
(74) *Attorney, Agent, or Firm* — Keating and Bennett, LLP

(57) ABSTRACT

An engine unit for a vehicle includes an engine body, an oil tank, and a power transmission shaft. The engine body includes a cylinder unit and a crankcase. The oil tank is disposed horizontally or substantially horizontally with respect to the engine body. The power transmission shaft includes a crankshaft supported by the crankcase. The power transmission shaft at least partially overlaps with the oil tank in a side view of the engine unit. The power transmission shaft extends from the engine body to a position beyond the oil tank in an axial direction of the crankshaft.

15 Claims, 9 Drawing Sheets

(56) References Cited

U.S. PATENT DOCUMENTS

2015/0300237 A1* 10/2015 Mcleod-Ross ......... B63H 11/00
165/41

* cited by examiner

ENGINE UNIT FOR VEHICLE

BACKGROUND OF THE INVENTION

1. Field of the Invention

The present invention relates to an engine unit for a vehicle.

2. Description of the Related Art

An engine unit includes an oil tank configured to store lubricating oil of an engine. For example, the oil tank is disposed on an imaginary line extending from a crankshaft of the engine in the structure described in Japan Laid-open Patent Application Publication No. JP-A-2003-27911.

When the oil tank is disposed on the imaginary line extending from the crankshaft as described above, there is a drawback that the engine unit is enlarged in the axial direction of the crankshaft by a space from the tip of the crankshaft to the outer surface of the oil tank. Especially, the engine unit is inevitably further enlarged when the oil tank is enlarged in the axial direction of the crankshaft so as to increase the capacity thereof.

SUMMARY OF THE INVENTION

Preferred embodiments of the present invention reliably provide an oil tank with a large capacity and an engine unit with a small size.

An engine unit for a vehicle according to a preferred embodiment of the present invention includes an engine body, an oil tank, and a power transmission shaft. The engine body includes a cylinder unit and a crankcase. The oil tank is disposed horizontally with respect to the engine body. The power transmission shaft includes a crankshaft supported by the crankcase. The power transmission shaft at least partially overlaps with the oil tank in a side view of the engine unit. The power transmission shaft extends from the engine body to a position beyond the oil tank in an axial direction of the crankshaft.

In the engine unit for a vehicle according to a preferred embodiment of the present invention, the power transmission shaft at least partially overlaps with the oil tank in the side view. However, the power transmission shaft extends from the engine body to the position beyond the oil tank in the axial direction of the crankshaft. Thus, even when the oil tank is enlarged in the axial direction of the crankshaft, the engine unit has a small size.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
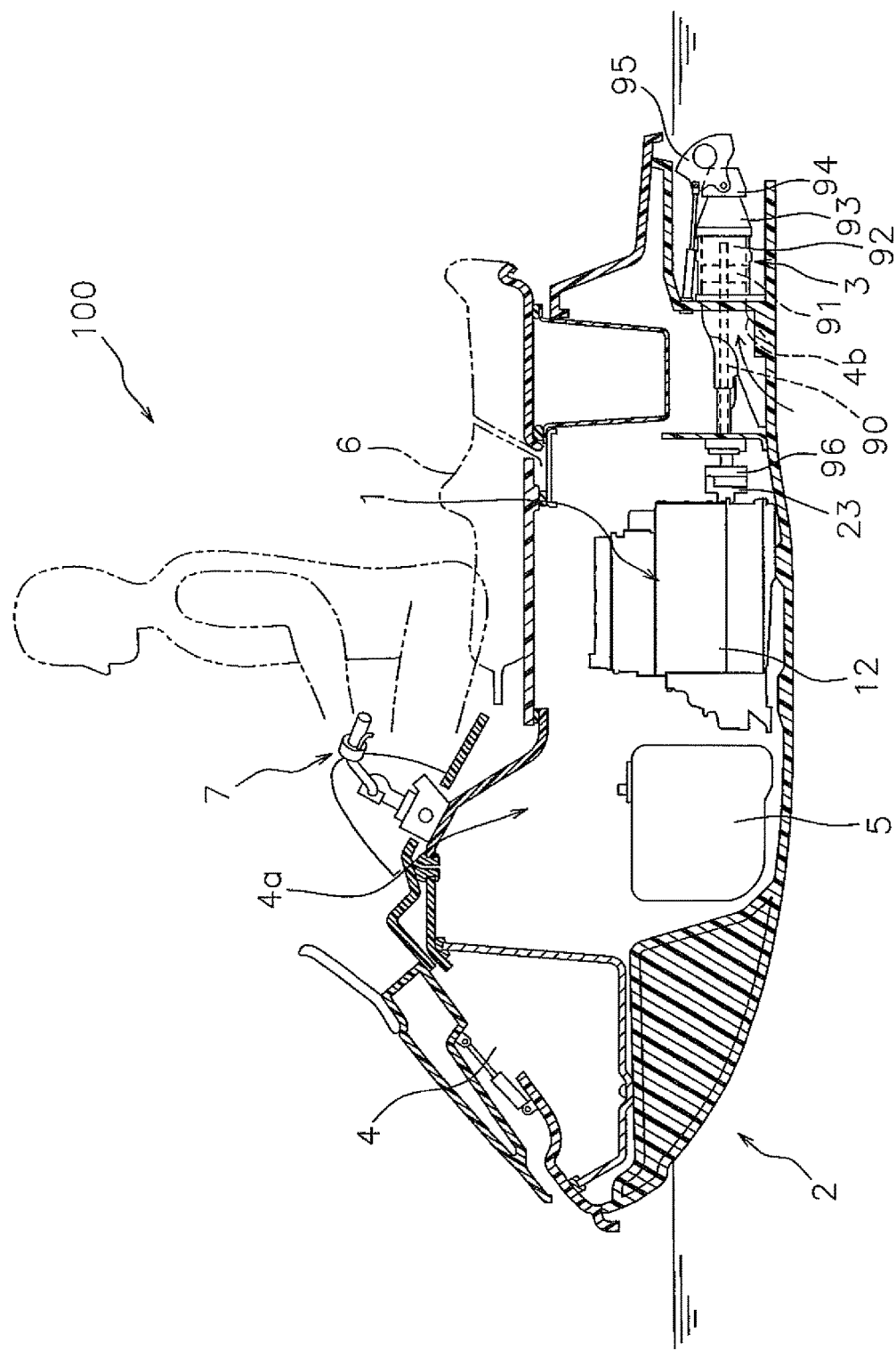
FIG. 1 is a cross-sectional view of an entire structure of a jet propelled watercraft equipped with an engine according to a preferred embodiment of the present invention.

Preferred embodiments of the present invention will be hereinafter explained with reference to the attached drawings. FIG. 1 is a cross-sectional view of an entire structure of a vehicle 100 equipped with an engine unit 1 according to a preferred embodiment of the present invention. The vehicle 100 preferably is, for example, a jet propelled watercraft, such as a so-called personal watercraft (PWC).

The vehicle 100 includes the engine unit 1 and a vehicle body 2. The vehicle body 2 includes a hull 4 and a jet propulsion unit 3. The engine unit 1 and the jet propulsion unit 3 are installed in the hull 4. The jet propulsion unit 3 is configured to be driven by the engine unit 1.

The hull 4 includes an engine compartment 4a in the interior thereof. The engine compartment 4a accommodates the engine unit 1, a fuel tank 5, and so forth. A seat 6 is attached to the hull 4. The seat 6 is disposed over the engine unit 1. The seat 6 is, for example, a saddle-ridding type seat. A steering member 7 is disposed in front of the seat 6 in order to steer the hull 4. It should be noted that in the following explanation, directional terms "front", "rear," "right" and "left" and their related terms refer to directions as seen from a rider seated on the seat 6 in a position of the vehicle 100 floating in still water.

The engine unit 1 includes a power transmission shaft 11. The power transmission shaft 11 is disposed so as to extend in the back-and-forth direction. The jet propulsion unit 3 is configured to suck in water surrounding the hull 4 and eject the water. The jet propulsion unit 3 includes an impeller shaft 90, an impeller 91, an impeller housing 92, a nozzle 93, a deflector 94, and a reverse gate 95. The impeller shaft 90 is disposed so as to extend rearwardly from the engine compartment 4a. The front portion of the impeller shaft 90 is connected to the power transmission shaft 11. The rear portion of the impeller shaft 90 extends into the impeller housing 92 through a water suction portion 4b of the hull 4. The impeller housing 92 is connected to the rear portion of the water suction portion 4b. The nozzle 93 is disposed behind the impeller housing 92.

The impeller 91 is attached to the rear portion of the impeller shaft 90. The impeller 91 is disposed in the interior of the impeller housing 92. The impeller 91 is configured to be rotated together with the impeller shaft 90 in order to suck in water from the water suction portion 4b of the hull 4. The impeller 91 is configured to cause the nozzle 93 to rearwardly eject the sucked in water. The deflector 94 is disposed behind the nozzle 93. The deflector 94 is configured to switch the direction of water ejected from the nozzle 93 in the right-and-left direction. The reverse gate 95 is disposed behind the deflector 94. The reverse gate 95 is configured to switch the direction of water ejected from the nozzle 93 and the deflector 94 toward the front of the vehicle 100.

The engine unit 1 includes the power transmission shaft 11 and an engine body 12. The power transmission shaft 11 protrudes rearwardly from the engine body 12. The power transmission shaft 11 is coupled to the impeller shaft 90.

Figure 2:
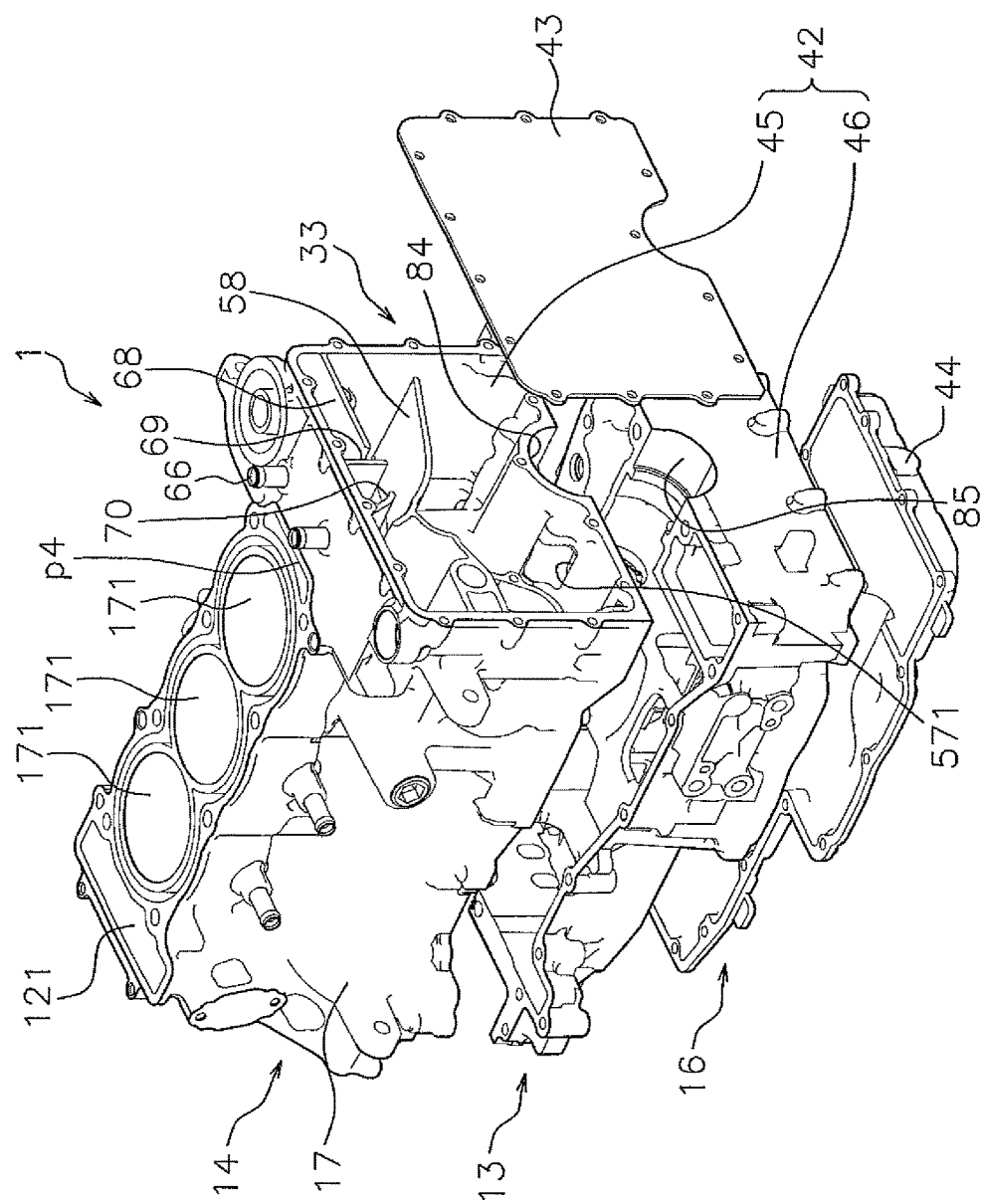
FIG. 2 is an exploded view of an engine unit.
Figure 3:
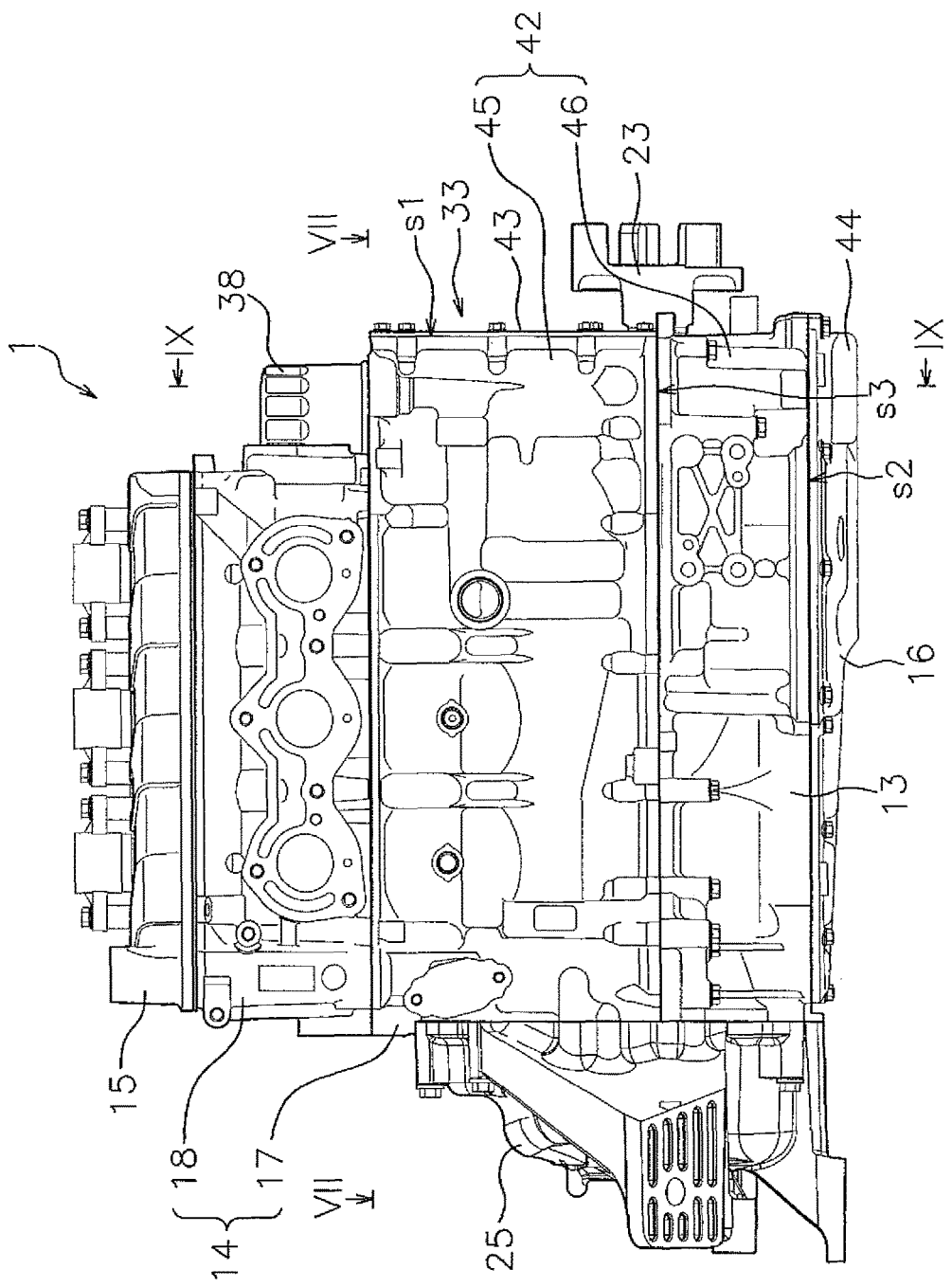
FIG. 3 is a side view of the engine unit.
Figure 4:
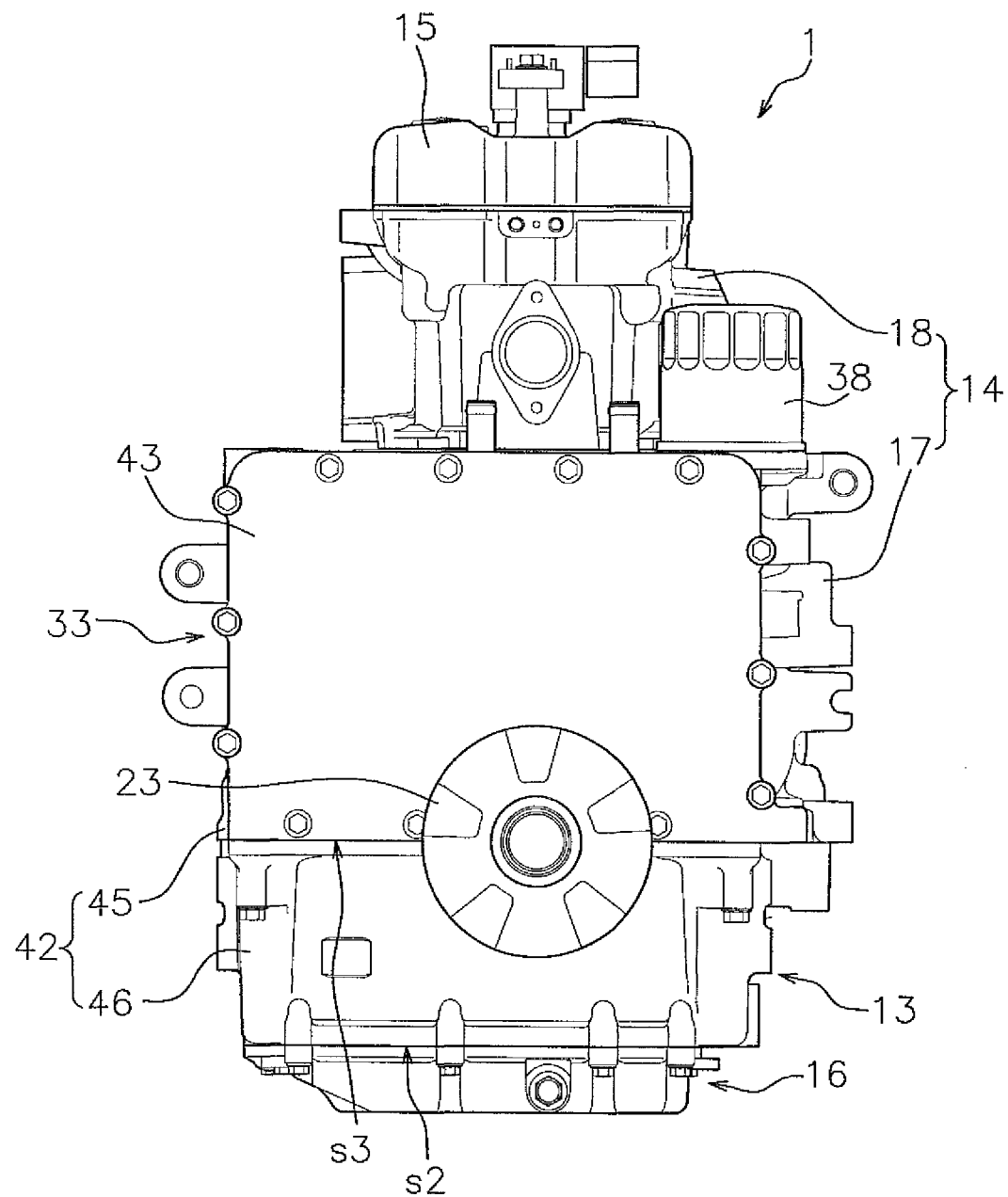
FIG. 4 is a rear view of the engine unit.
Figure 5:
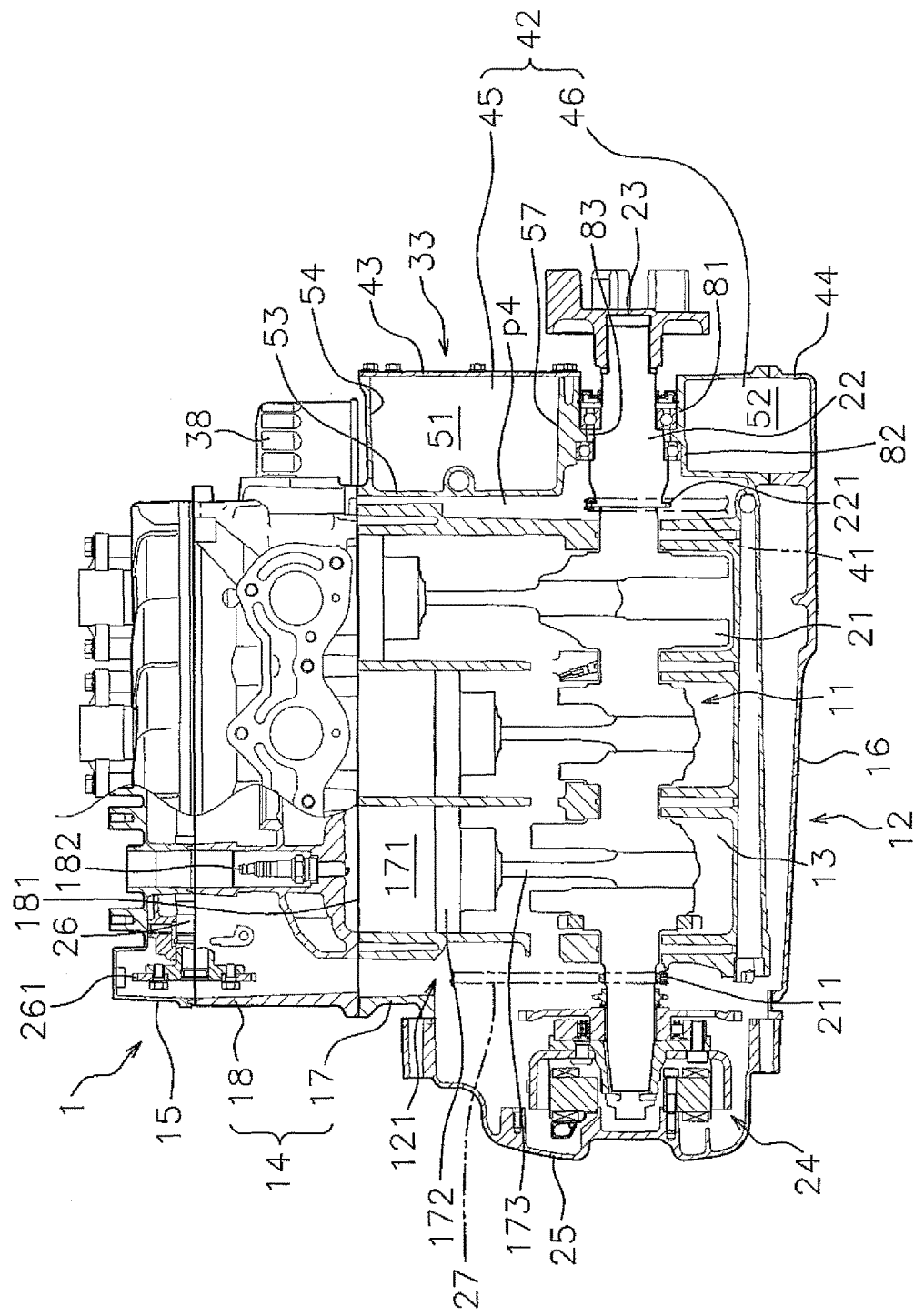
FIG. 5 is a cross-sectional side view of the engine unit.

FIG. 2 is an exploded view of the engine unit 1. FIG. 3 is a side view of the engine unit 1. FIG. 4 is a rear view of the engine unit 1. FIG. 5 is a cross-sectional side view of the engine unit 1. As shown in FIGS. 2 to 5, the engine body 12 includes a crankcase 13, a cylinder unit 14, a head cover 15, and an oil pan 16.

The cylinder unit 14 is disposed over the crankcase 13. The cylinder unit 14 includes a cylinder body 17 and a cylinder head 18. It should be noted that the head cover 15 and the cylinder head 18 are not shown in FIG. 2. The cylinder unit 14 is preferably a discrete element separate from the crankcase 13. The cylinder body 17 and the cylinder head 18 are preferably discrete elements separate from each other. It should be noted that the cylinder body 17 and the cylinder head 18 may be an integral and unitary element. The crankcase 13 and the cylinder body 17 may be an integral and unitary element. The head cover 15 is disposed over the cylinder unit 14. The oil pan 16 is disposed under the crankcase 13. The oil pan 16 is preferably a discrete element separate from the crankcase 13.

As shown in FIG. 5, the power transmission shaft 11 includes a crankshaft 21, a coupling shaft 22, and a coupling member 23. The crankshaft 21 extends in the horizontal or substantially horizontal direction. The crankshaft 21 is accommodated in the crankcase 13. The crankshaft 21 is preferably supported by the crankcase 13 and the cylinder body 17. It should be noted that the crankshaft 21 may be supported only by the crankcase 13. A power generator 24 is connected to the front end of the crankshaft 21. A power generator cover 25 is attached to the engine body 12. The power generator cover 25 is disposed in front of the engine body 12. The power generator 24 is disposed inside the power generator cover 25.

The coupling shaft 22 is preferably a discrete element separate from the crankshaft 21, and is coupled to the crankshaft 21. When described in detail, the coupling shaft 22 is coupled to the rear end of the crankshaft 21. The coupling member 23 is preferably a discrete element separate from the coupling shaft 22, and is coupled to the coupling shaft 22. When described in detail, the coupling member 23 is connected to the rear end of the coupling shaft 22. As shown in FIG. 1, the coupling member 23 of the power transmission shaft 11 is coupled to a coupling member 96 of the impeller shaft 90.

The cylinder body 17 includes a plurality of cylinders 171 preferably disposed in alignment in the back-and-forth direction. The axes of the respective cylinders 171 preferably extend in the up-and-down direction. Pistons 172 are disposed inside the cylinders 171 on a one-to-one basis. Each piston 172 is coupled to the crankshaft 21 through a connecting rod 173. Combustion chambers 181 are provided inside the cylinder head 18. Spark plugs 182 are attached to the cylinder head 18.

It should be noted that in FIG. 5, reference numerals are assigned to only one of the cylinders 171, one of the pistons 172, and one of the connecting rods 173, and thus are not assigned to the other cylinders 171, the other pistons 172, and the other connecting rods 173. In the present preferred embodiment, the engine unit 1 preferably is a three-stroke engine, for example. It should be noted that the number of the cylinders 171 is not limited to three, and alternatively, may be less than three or more than three.

A camshaft 26 is disposed inside the cylinder head 18 and the head cover 15. When the cam shaft 26 is driven, an intake valve and an exhaust valve (not shown in the drawings), mounted to each combustion chamber 181, are configured to be opened and closed. A first sprocket 261 is attached to the front end of the cam shaft 26. A second sprocket 211 is preferably press-fitted, for example, to the crankshaft 21. A cam chain 27 is wrapped about the first sprocket 261 and the second sprocket 211. The cam shaft 26 is configured to be driven when rotation of the crankshaft 21 is transmitted thereto through the cam chain 27.

The engine body 12 includes a cam chain compartment 121. The cam chain 27 is disposed in the cam chain compartment 121. The cam chain compartment 121 is disposed across the crankcase 13 and the cylinder unit 14. The cam chain compartment 121 is disposed in front of the cylinders 171. The cam chain compartment 121 is disposed between the power generator cover 25 and the cylinders 171.

Figure 6:
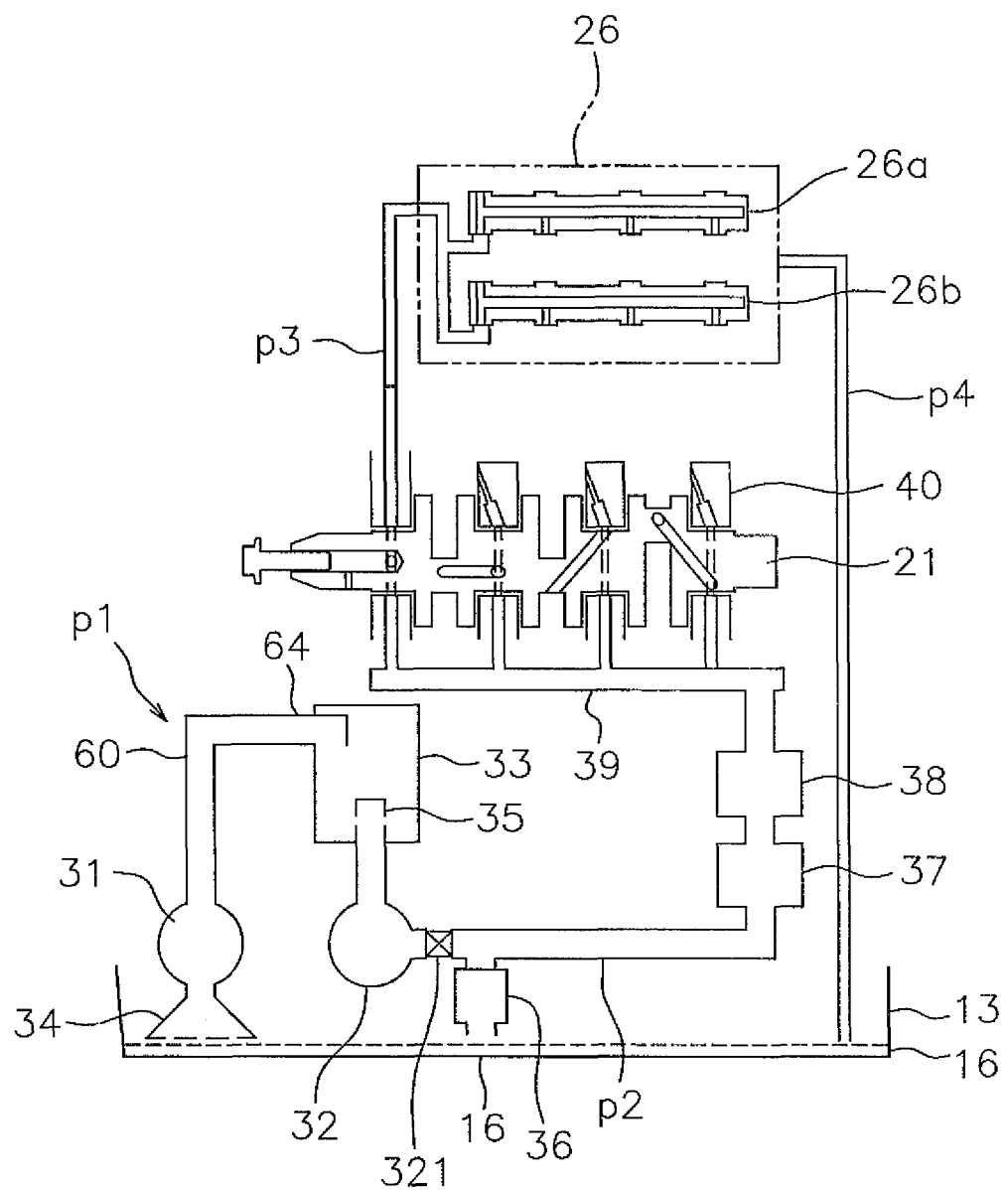
FIG. 6 is a schematic view of a lubrication system of the engine.

Next, a lubrication system of the engine unit 1 will be explained. FIG. 6 is a schematic diagram showing the lubrication system of the engine unit 1. The engine unit 1 uses a dry sump as a lubrication method. As shown in FIG. 6, the engine unit 1 includes a scavenging pump 31, a feed pump 32, and an oil tank 33. The scavenging pump 31 is connected to a space defined by the oil pan 16 and the crankcase 13 through a strainer 34. Further, the scavenging pump 31 is connected to the oil tank 33 through a first oil path p1. The feed pump 32 is connected to the oil tank 33 through a strainer 35. The oil tank 33 will be explained below in detail.

The feed pump 32 is connected to a second oil path p2 through a check valve 321. The check valve 321 allows the lubricating oil to flow from the oil tank 33 to the second oil path p2. The check valve 321 prevents the lubricating oil from reversely flowing from the second oil path p2 to the oil tank 33. Further, a relief valve 36 is connected to the second oil path p2. The relief valve 36 is configured to be opened when the pressure of the lubricating oil within the feed pump 32 becomes a predetermined relief pressure or greater. When the relief valve 36 is opened, the lubricating oil within the feed pump 32 partially flows to the oil pan 16.

The second oil path p2 is connected to a main gallery 39 through an oil cooler 37 and an oil cleaner 38. The main gallery 39 is connected to oil paths inside the crankshaft 21. Further, the main gallery 39 is connected to a third oil path p3. The third oil path p3 is connected to oil paths inside the cam shaft 26. It should be noted that the cam shaft 26 includes an exhaust cam shaft 26a and an intake cam shaft 26b. The third oil path p3 is connected to an oil path of the exhaust cam shaft 26a and an oil path of the intake cam shaft 26b.

The oil paths inside the camshaft 26 are connected to a fourth oil path p4. The fourth oil path p4 is connected to the oil path of the exhaust cam shaft 26a and the oil path of the intake cam shaft 26b. The fourth oil path p4 is connected to the space inside the oil pan 16. The fourth oil path p4 will be explained below in detail.

In the engine unit 1 according to the present preferred embodiment, the lubricating oil is fed to the second oil path p2 from the oil tank 33 by the feed pump 32. The lubricating oil is further fed from the second oil path p2 to the main gallery 39 through the oil cooler 37 and the oil cleaner 38.

The lubricating oil is partially supplied from the main gallery 39 to journals of the crankshaft 21 through the oil paths inside the crankshaft 21. Further, the lubricating oil is supplied from the oil paths inside the crankshaft 21 to the pistons 172 (see FIG. 5) through piston coolers 40.

The lubricating oil is partially fed from the main gallery 39 to the oil paths inside the cam shaft 26 through the third oil path p3. The lubricating oil is supplied to journals of the cam shaft 26 through the oil paths inside the cam shaft 26.

The oil, supplied to the respective elements disposed inside the engine body 12 as described above, flows through the interior of the cylinder head 18 or that of the crankcase 13 and returns to the oil pan 16. Further, a surplus amount of lubricating oil inside the cam shaft 26 flows through the fourth oil path p4 and returns to the oil pan 16. The lubricating oil is returned from the oil pan 16 to the oil tank 33 by the scavenging pump 31.

Figure 7:
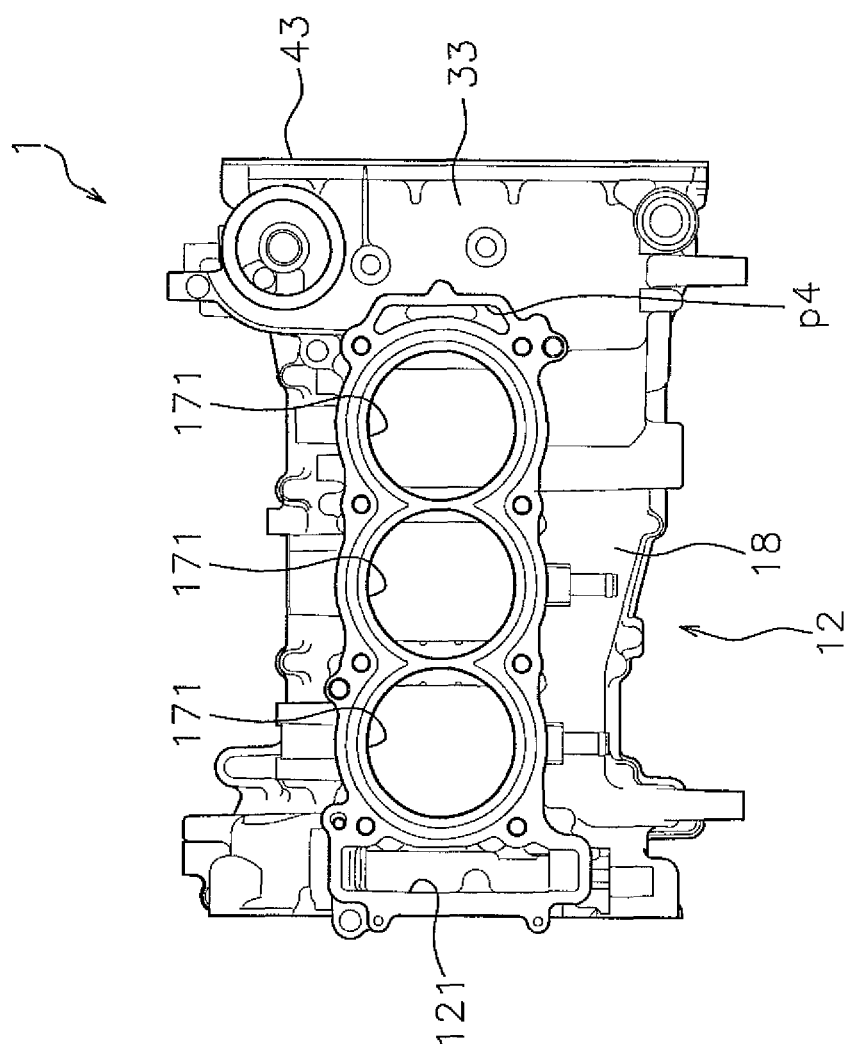
FIG. 7 is a top view of a cylinder unit.

FIG. 7 is a top view of the cylinder unit 14. As shown in FIGS. 5 and 7, the oil tank 33 is preferably disposed behind the engine body 12. When described in detail, the oil tank 33 is disposed behind the crankcase 13 and the cylinder body 17. The fourth oil path p4 is preferably disposed in front of the oil tank 33. The fourth oil path p4 is preferably disposed behind the cylinders 171. The fourth oil path p4 is preferably disposed between the oil tank 33 and the cylinder unit 14 in the back-and-forth direction. The fourth oil path p4 communicates with the space inside the head cover 15, extends downwardly in the cylinder head 18, and extends to the oil pan 16 via the cylinder body 17. The fourth oil path p4 is preferably at least partially integral and unitary with the oil tank 33. The fourth oil path p4 may be at least partially integral and unitary with the cylinder head 18 and the cylinder body 17.

As shown in FIG. 5, the engine unit 1 includes a pump drive mechanism 41. The pump drive mechanism 41 is configured to drive the scavenging pump 31 and the feed pump 32 in conjunction with rotation of the crankshaft 21. In the present preferred embodiment, the pump drive mechanism 41 is a chain, for example. The pump drive mechanism 41 is wrapped about the drive shaft of the scavenging pump 31, the drive shaft of the feed pump 32, and the power transmission shaft 11. When described in detail, the pump drive mechanism 41 is wrapped about a sprocket 221 mounted to the coupling shaft 22. Rotation of the power transmission shaft 11 is configured to be transmitted to the drive shaft of the scavenging pump 31 and the drive shaft of the feed pump 32 through the pump drive mechanism 41. The scavenging pump 31 and the feed pump 32 are thus driven.

The pump drive mechanism 41 is disposed in an intermediate portion of the fourth oil path p4. Thus, the pump drive mechanism 41 is lubricated by the lubricating oil flowing through the fourth oil path p4. It should be noted that the pump drive mechanism 41 is not limited to a chain, and alternatively, may be another member. For example, the pump drive mechanism 41 may be a gear.

Next, a structure of the oil tank 33 will be explained in detail. As shown in FIG. 5, the oil tank 33 preferably has a shape elongated in the up-and-down direction. The oil tank 33 is preferably integral and unitary with the engine body 12. The fourth oil path p4 is also preferably integral and unitary with the oil tank 33. The fourth oil path p4 is preferably integral and unitary with the engine body 12 and the oil tank 33 by being die cast together. This structure eliminates the necessity of separately providing other members such as a hose, and achieves a reduction in the number of components. Further, a large space is reliably provided in an area surrounding the engine unit 1 in comparison with a structure that other members such as a hose are separately provided and disposed in the space surrounding the engine unit 1.

As shown in FIG. 2, the oil tank 33 includes a tank body 42, a first component 43, and a second component 44. The tank body 42 includes a first body portion 45 and a second body portion 46. The second body portion 46 is preferably a discrete element separate from the first body portion 45. The first body portion 45 is preferably integrally molded with the cylinder unit 14. When described in detail, the first body portion 45 is integrally molded with the cylinder body 17. The first body portion 45 is located behind the cylinder unit 14. The second body portion 46 is preferably integrally molded with the crankcase 13. The second body portion 46 is located behind the crankcase 13. The second body portion 46 is located under the first body portion 45.

The first component 43 is preferably a discrete element separate from the tank body 42. The first component 43 preferably is a plate-shaped, i.e., flat, member. The first component 43 is joined to the tank body 42. When described in detail, the first component 43 is joined to the rear surface of the first body portion 45. The rear surface of the first body portion 45 opens horizontally. The first component 43 is joined to the first body portion 45, and thus, covers the opening in the rear surface of the first body portion 45.

The bottom surface of the first body portion 45 opens downwardly. The top surface of the second body portion 46 opens upwardly. The cylinder unit 14 is joined to the crankcase 13, and thus, the first body portion 45 is joined to the second body portion 46. With this structure, the second body portion 46 covers the opening in the bottom surface of the first body portion 45. In turn, the first body portion 45 covers the top surface of the second body portion 46.

The second component 44 is preferably a discrete element separate from the tank body 42. The second component 44 is preferably integrally molded with the oil pan 16. The oil pan 16 is joined to the crankcase 13, and thus, the second component 44 is joined to the tank body 42. When described in detail, the second component 44 is joined to the bottom surface of the second body portion 46. The bottom surface of the second body portion 46 opens downwardly. The second component 44 covers the opening in the bottom surface of the tank body 42.

As shown in FIG. 3, a first joint surface s1 between the tank body 42 and the first component 43 extends in a first direction different from that of a second direction in which the second joint surface s2 extends between the tank body 42 and the second component 44. Further, the first joint surface s1 and the second joint surface s2 are separated from each other. When described in detail, the first direction in which the first joint surface s1 extends is vertical or substantially vertical. By contrast, the second direction in which the second joint surface s2 extends is horizontal or substantially horizontal. Therefore, the first direction in which the first joint surface s1 extends is orthogonal or substantially orthogonal to the second direction in which the second joint surface s2 extends.

The first joint surface s1 between the tank body 42 and the first component 43 extends in the first direction different from that of a third direction in which the third joint surface s3 extends between the first body portion 45 and the second body portion 46. The first joint surface s1 is located over the third joint surface s3. When described in detail, the third direction in which the third joint surface s3 extends is horizontal or substantially horizontal. Therefore, the first direction of the first joint surface s1 is orthogonal or substantially orthogonal to the third direction in which the third joint surface s3 extends.

As shown in FIG. 5, the oil tank 33 includes an upper oil chamber 51 and a lower oil chamber 52. The upper oil chamber 51 is inside the first body portion 45. The lower oil chamber 52 is inside the second body portion 46.

Figure 8:
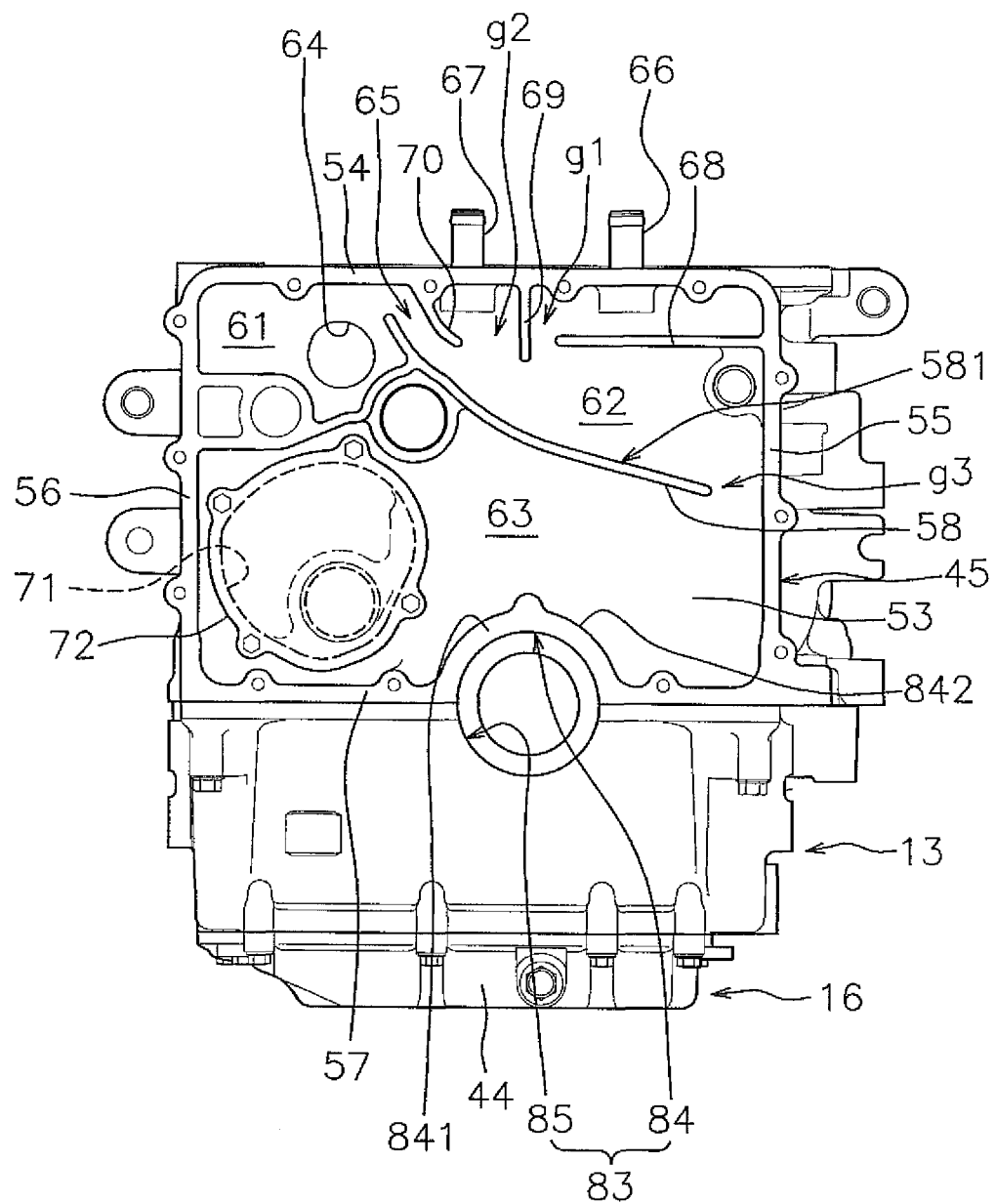
FIG. 8 is a rear view of the interior of an oil tank.

FIG. 8 is a rear view of the engine unit 1 in a condition that the first component 43 is detached therefrom. The first body portion 45 includes a partition wall 53, a top wall 54, a first sidewall 55, a second sidewall 56, and a bottom wall 57. As shown in FIG. 5, the partition wall 53 divides the upper oil chamber 51 and the space inside the cylinder unit 14. The top wall 54, the first sidewall 55, the second sidewall 56, and the bottom wall 57 extend rearwardly from the partition wall 53.

Figure 9:
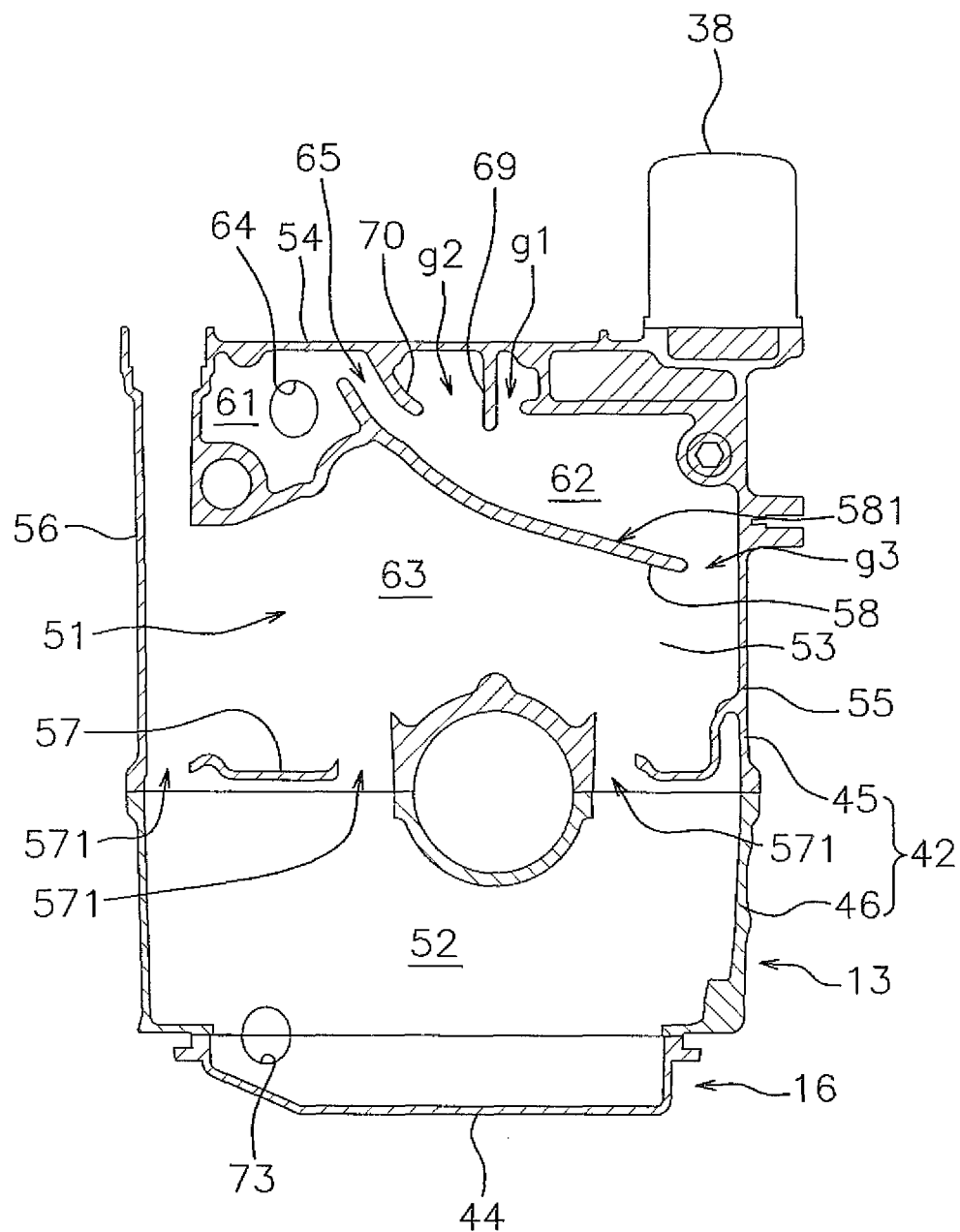
FIG. 9 is a cross-sectional view of the engine unit taken along a cutaway line IX-IX in FIG. 3.

The bottom wall 57 is disposed between the upper oil chamber 51 and the lower oil chamber 52. The bottom wall 57 divides the upper oil chamber 51 and the lower oil chamber 52. FIG. 9 is a cross-sectional view of FIG. 3 taken along a cutaway line IX-IX. As shown in FIG. 9, the bottom wall 57 includes a plurality of apertures 571 penetrating therethrough in the up-and-down direction. The upper oil chamber 51 and the lower oil chamber 52 communicate with each other through these apertures 571.

As shown in FIG. 8, the first body portion 45 includes a guide plate 58 extending horizontally or substantially horizontally in the interior thereof. When described in detail, the guide plate 58 extends in the back-and-forth direction. The guide plate 58 extends rearwardly from the partition wall 53. The guide plate 58 divides the upper oil chamber 51 into a first chamber 61, a second chamber 62, and a third chamber 63.

The first body portion 45 includes a portion 64 (hereinafter referred to as a first pump connection path 64) of the first oil path p1. The first pump connection path 64 is connected to the first chamber 61. It should be noted that as shown in FIG. 6, the first oil path p1 further includes a path 60. The path 60 extends in the up-and-down direction. The first pump connection path 64 is connected to the scavenging pump 31 through the path 60. The first pump connection path 64 extends in the back-and-forth direction.

The second chamber 62 is located laterally of the first chamber 61. The second chamber 62 communicates with the first chamber 61 through a communication path 65. The width of the communication path 65 is preferably narrower than the up-and-down directional width of the first chamber 61. The guide plate 58 includes a tilt portion 581. The tilt portion 581 divides the second chamber 62 and the third chamber 63. The tilt portion 581 is located under the second chamber 62. The tilt portion 581 tilts downwardly to a lateral side.

The first body portion 45 includes a first connection port 66 and a second connection port 67. The first connection port 66 and the second connection port 67 communicate with the upper oil chamber 51. The first connection port 66 is connected to a separator (not shown in the drawings). The second connection port 67 is connected to the head cover 15. The first connection port 66 and the second connection port 67 are located over the second chamber 62. The first connection port 66 and the second connection port 67 are aligned in the right-and-left direction.

The first body portion 45 includes a first partition 68, a second partition 69, and a third partition 70. The first partition 68 divides the second chamber 62 and the first connection port 66. The second partition 69 divides the first connection port 66 and the second connection port 67. The third partition 70 divides the second connection port 67 and the communication path 65. The second chamber 62 and the space in which the first connection port 66 is disposed communicate through a first gap g1. The second chamber 62 and the space in which the second connection port 67 is disposed communicate through a second gap g2.

The third chamber 63 is located under the first chamber 61 and the second chamber 62. The third chamber 63 communicates with the second chamber 62 through a third gap g3. The first body portion 45 includes an opening 71. The opening 71 is provided in the third chamber 63. The opening 71 extends in the back-and-forth direction and communicates with the interior of the crankcase 13. The opening 71 is closed by a lid member 72. The bottom wall 57 is disposed under the third chamber 63. As shown in FIG. 9, the third chamber 63 communicates with the lower oil chamber 52 through the plurality of apertures 571 of the bottom wall 57. The bottom wall 57 functions as a baffle plate to lessen and stabilize the momentum of the lubricating oil flowing from the third chamber 63 to the lower oil chamber 52.

As shown in FIG. 9, the second body portion 46 includes a second pump connection path 73. When described in detail, the second pump connection path 73 is disposed across the second body portion 46 and the second component 44. The second pump connection path 73 is connected to the lower oil chamber 52. The strainer 35 is disposed inside the second pump connection path 73 and is connected to the feed pump 32. The second pump connection path 73 extends in the back-and-forth direction.

The lubricating oil, existing inside the oil pan 16, is fed to the first oil path p1 by the scavenging pump 31. The lubricating oil is fed to the first chamber 61 through the first pump connection path 64. The lubricating oil is fed from the first chamber 61 to the second chamber 62 through the communication path 65. The lubricating oil flows along the tilt portion 581 in the second chamber 62 and is fed to the third chamber 63. The lubricating oil is fed from the third chamber 63 to the lower oil chamber 52 through the apertures 571 of the bottom wall 57. The lubricating oil is sucked from the lower oil chamber 52 into the feed pump 32 through the second pump connection path 73 and is fed to the second oil path p2 by the feed pump 32.

As shown in FIG. 5, the oil tank 33 supports the power transmission shaft 11 through bearings 81 and 82. The power transmission shaft 11 at least partially overlaps with the oil tank 33 in a side view. The power transmission shaft 11 extends rearwardly from the engine body 12 to a position beyond the oil tank 33.

When described in detail, the coupling shaft 22 overlaps with the oil tank 33 in the side view. Further, the coupling shaft 22 is supported by the oil tank 33 through the bearings 81 and 82. The coupling shaft 22 extends rearwardly from the engine body 12 to a position beyond the oil tank 33.

As shown in FIG. 8, the oil tank 33 includes a through hole 83 extending in the axial direction of the power transmission shaft 11. The power transmission shaft 11 is disposed inside the through hole 83. When described in detail, the coupling shaft 22 is disposed inside the through hole 83. Thus, the oil tank 33 has a shape configured to avoid contact with the power transmission shaft 11. A structure of the oil tank 33 surrounding the power transmission shaft 11 will be hereinafter explained.

The upper oil chamber 51 is located over the power transmission shaft 11. The lower oil chamber 52 is located under the power transmission shaft 11. The power transmission shaft 11 is partially disposed between the upper oil chamber 51 and the lower oil chamber 52. The power transmission shaft 11 is supported by the bottom surface of the upper oil chamber 51 and the top surface of the lower oil chamber 52. The power transmission shaft 11 is supported by the bottom surface of the upper oil chamber 51 and the top surface of the lower oil chamber 52 through the bearings 81 and 82.

The bottom wall 57 includes an upper recess 84 having an upwardly recessed shape. The upper recess 84 includes slopes 841 and 842 that correspond to the shape of the power transmission shaft 11. When described in detail, the upper recess 84 preferably has a circular or substantially circular-arc shape that corresponds to the shape of the power transmission shaft 11. The space inside the upper recess 84 is separate from the upper oil chamber 51.

The upper surface of the second body portion 46 includes a lower recess 85 having a downwardly recessed shape. The lower recess 85 preferably has a circular or substantially circular-arc shape that corresponds to the shape of the power transmission shaft 11. The space inside the lower recess 85 is separate from the lower oil chamber 52. The power transmission shaft 11 is disposed between the upper recess 84 and the lower recess 85. In other words, the through hole 83 is defined by the upper recess 84 and the lower recess 85.

In the vehicle 100 according to the present preferred embodiment, the power transmission shaft 11 partially overlaps with the oil tank 33 in the side view. However, the power transmission shaft 11 extends from the engine body 12 to the position beyond the oil tank 33 in the axial direction of the crankshaft 21. Therefore, even when the oil tank 33 is enlarged in the axial direction of the crankshaft 21, the engine unit 1 still has a small size.

Preferred embodiments of the present invention have been explained above. However, the present invention is not limited to the preferred embodiments described above, and a variety of changes can be made without departing from the scope of the present invention.

In the above preferred embodiments, the vehicle 100 is preferably a jet propelled watercraft. However, the vehicle according to the preferred embodiments of the present invention is not limited to a jet propelled watercraft. Further, the vehicle according to the preferred embodiments of the present invention is not limited to a water vehicle, and may be another type of vehicle such as an ATV (All Terrain Vehicle), a snowmobile, or a motorcycle. Alternatively, the jet propelled watercraft is not limited to the PWC as described in the preferred embodiments above, and may be another type of water vehicle such as a sport boat.

The orientation of the engine unit 1 is not limited to that described in the above preferred embodiments. For example, the orientation of the engine unit 1 may be reversed in the back-and-forth direction from that described in the above preferred embodiments. Alternatively, the engine unit 1 may be disposed such that the axis of the crankshaft 21 is oriented in the right-and-left direction of the vehicle.

In the engine unit according to the preferred embodiments of the present invention described above, the term "lateral" does not necessarily mean a direction matched with the right-and-left direction of the vehicle including the engine unit. In the engine unit according a preferred embodiment of the present invention, the term "lateral" may mean any direction in the horizontal direction.

The structure or the positional arrangement of the oil tank 33 is not limited to that described in the above preferred embodiments, and may be changed. For example, the oil tank 33 may be a discrete element separate from the engine body 12. The oil tank 33 may not be divided into the tank body 42, the first component 43, and the second component 44. The tank body 42 may not be divided into the first body portion 45 and the second body portion 46. The second component 44 may be a discrete element separate from the oil pan 16.

In the above preferred embodiments, the oil tank 33 includes the through hole 83. However, the oil tank 33 may have a recessed shape so as to avoid contact with the power transmission shaft 11. For example, the bottom surface of the oil tank 33 may have an upwardly recessed shape so as to avoid contact with the power transmission shaft 11. Alternatively, the top surface of the oil tank 33 may have a downwardly recessed shape so as to avoid contact with the power transmission shaft 11. Yet alternatively, the lateral surface of the oil tank 33 may have a laterally recessed shape so as to avoid contact with the power transmission shaft 11.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An engine for a vehicle, the engine comprising:
    an engine body including a cylinder and a crankcase;
    an oil tank disposed horizontally or substantially horizontally with respect to the engine body; and
    a power transmission shaft including a crankshaft supported by the crankcase; wherein
    the power transmission shaft:
        at least partially overlaps with the oil tank in a side view of the engine;
        extends from the engine body and through the oil tank to a position beyond the oil tank in an axial direction of the crankshaft; and
        is not exposed to or in contact with oil in the oil tank.

2. The engine for a vehicle according to claim 1, wherein the oil tank has a shape configured to avoid contact with the power transmission shaft.

3. The engine for a vehicle according to claim 1, wherein the oil tank includes an upper oil chamber and a lower oil chamber, the upper oil chamber is located over the power transmission shaft, and the lower oil chamber is located under the crankshaft.

4. The engine for a vehicle according to claim 3, wherein the power transmission shaft is partially disposed between the upper oil chamber and the lower oil chamber.

5. The engine for a vehicle according to claim 3, wherein the upper oil chamber and the lower oil chamber communicate with each other.

6. The engine for a vehicle according to claim 3, wherein the power transmission shaft is supported by a bottom surface of the upper oil chamber and a top surface of the lower oil chamber.

7. The engine for a vehicle according to claim 1, wherein the vehicle is a jet propelled watercraft.

8. The engine for a vehicle according to claim 1, wherein the vehicle is a saddle-riding type vehicle.

9. An engine for a vehicle, the engine comprising:
    an engine body including a cylinder and a crankcase;
    an oil tank disposed horizontally or substantially horizontally with respect to the engine body; and
    a power transmission shaft including a crankshaft supported by the crankcase, the power transmission shaft at least partially overlapping with the oil tank in a side view of the engine, and the power transmission shaft extending from the engine body to a position beyond the oil tank in an axial direction of the crankshaft; wherein
    the oil tank includes a through hole extending in an axial direction of the power transmission shaft; and
    the power transmission shaft is partially disposed inside the through hole.

10. An engine for a vehicle, the engine comprising:
    an engine body including a cylinder and a crankcase;
    an oil tank disposed horizontally or substantially horizontally with respect to the engine body; and
    a power transmission shaft including a crankshaft supported by the crankcase, the power transmission shaft at least partially overlapping with the oil tank in a side view of the engine, and the power transmission shaft extending from the engine body to a position beyond the oil tank in an axial direction of the crankshaft; wherein the oil tank includes an upper oil chamber, a lower oil chamber, and a baffle plate disposed between the upper oil chamber and the lower oil chamber;

the upper oil chamber is located over the power transmission shaft; and the lower oil chamber is located under the crankshaft.

11. The engine for a vehicle according to claim 10, wherein the baffle plate includes a slope corresponding to a shape of the power transmission shaft.

12. An engine for a vehicle, the engine comprising:

an engine body including a cylinder and a crankcase;

an oil tank disposed horizontally or substantially horizontally with respect to the engine body;

a power transmission shaft including a crankshaft supported by the crankcase and a coupling shaft, the power transmission shaft at least partially overlapping with the oil tank in a side view of the engine, and the power transmission shaft extending from the engine body to a position beyond the oil tank in an axial direction of the crankshaft; and an oil pump; wherein the coupling shaft is separate from the crankshaft and coupled to the crankshaft; and the coupling shaft includes a pump drive mechanism configured to drive the oil pump.

13. A vehicle comprising:

an engine; and a vehicle body including the engine; wherein the engine includes:

an engine body including a cylinder and a crankcase;

an oil tank disposed horizontally with respect to the engine body; and a power transmission shaft including a crankshaft supported by the crankcase; wherein the power transmission shaft:

at least partially overlaps with the oil tank in a side view of the engine;

extends from the engine body and through the oil tank to a position beyond the oil tank in an axial direction of the crankshaft; and is not exposed to or in contact with oil in the oil tank.

14. The vehicle according to claim 13, further comprising:

a jet propulsion unit configured to be driven by the engine; wherein the vehicle body is a hull accommodating the engine and the jet propulsion unit.

15. The vehicle according to claim 13, further comprising a saddle-riding type seat attached to the vehicle body.

* * * * *